Dec. 31, 1940. M. J. KIRK ET AL 2,226,822

VARIABLE INDUCTANCE MECHANISM

Filed March 21, 1938 3 Sheets-Sheet 1

INVENTOR.
MARTIN J. KIRK.
FREDERICK N. JACOB.
BY JOSEPH C. McGINLEY.

Albert C. Bell
ATTORNEY.

Dec. 31, 1940.　　　M. J. KIRK ET AL　　　2,226,822
VARIABLE INDUCTANCE MECHANISM
Filed March 21, 1938　　　3 Sheets-Sheet 2
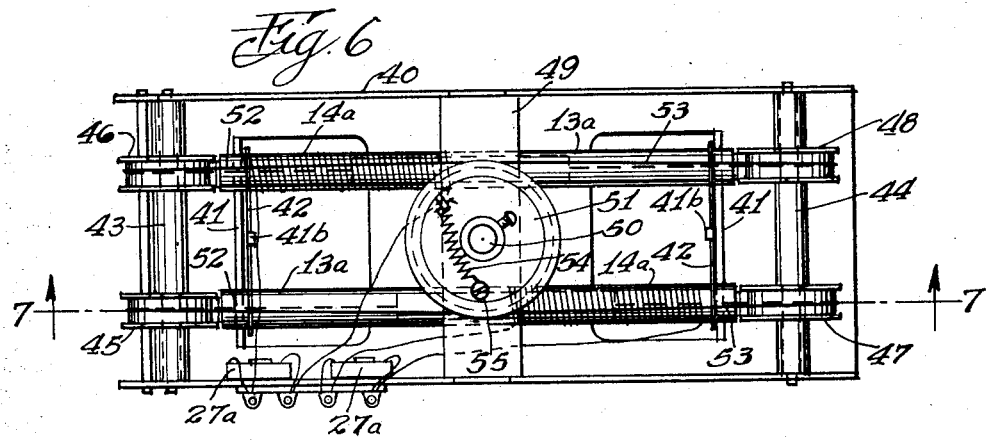
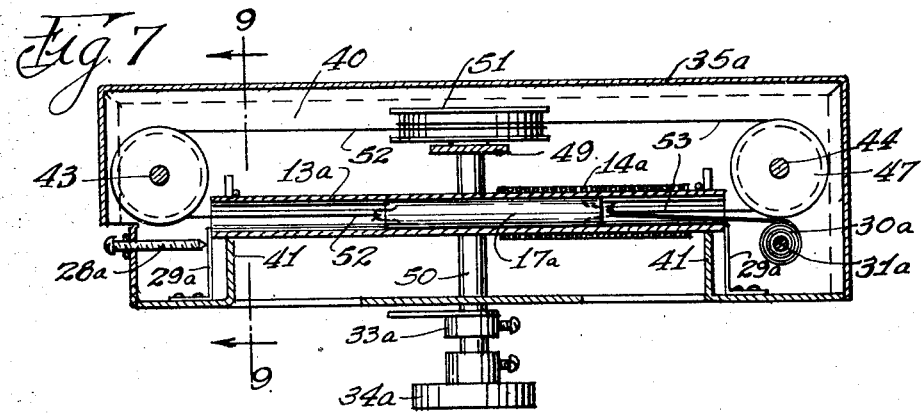
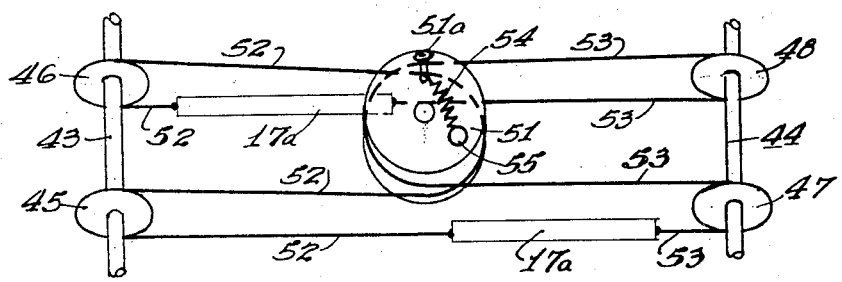
INVENTOR.
MARTIN J. KIRK
FREDERICK N. JACOB
BY JOSEPH C. McGINLEY.
Albert C. Bell
ATTORNEY.

Dec. 31, 1940.　　　M. J. KIRK ET AL　　　2,226,822
VARIABLE INDUCTANCE MECHANISM
Filed March 21, 1938　　　3 Sheets-Sheet 3
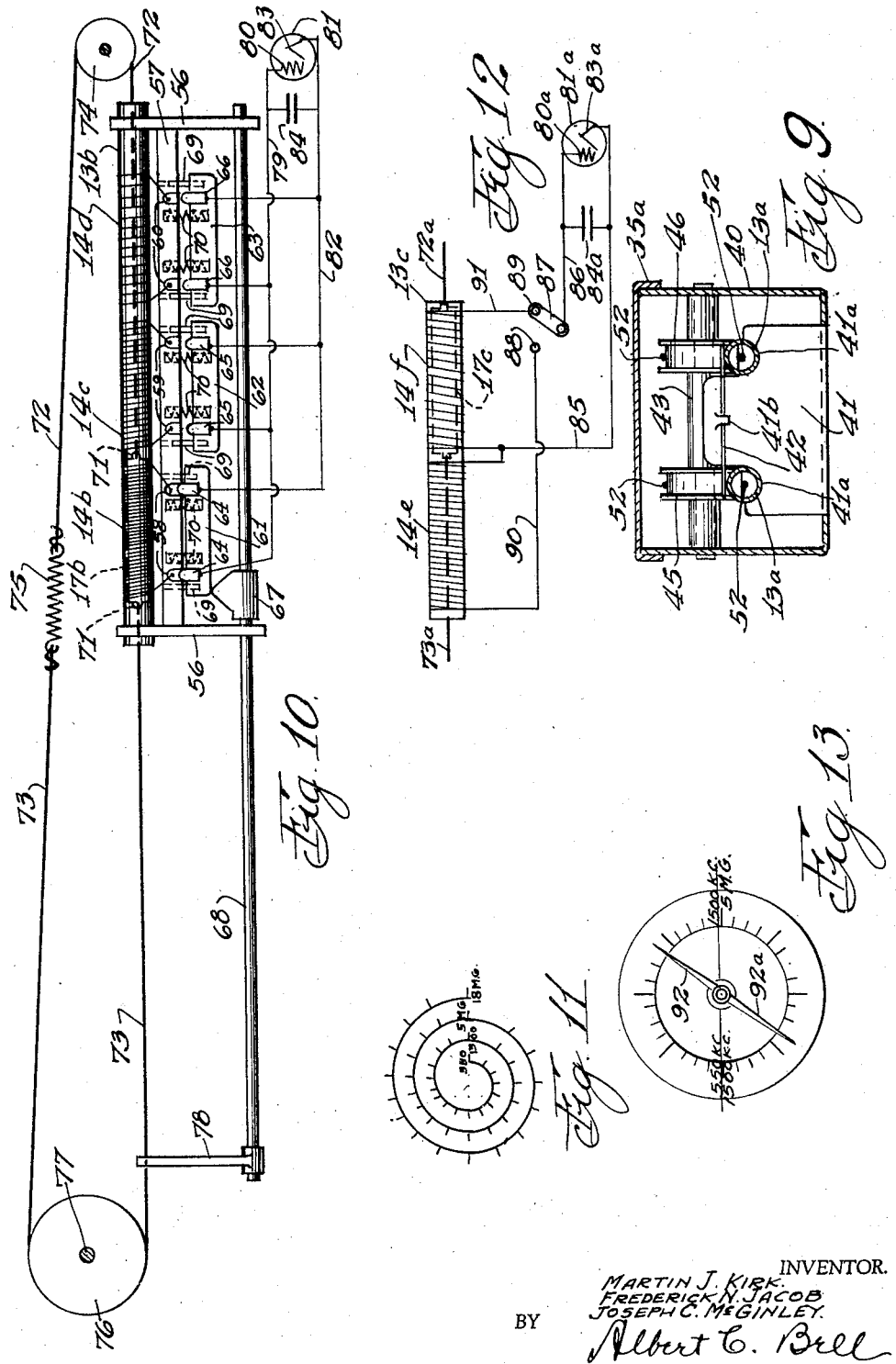
INVENTOR.
MARTIN J. KIRK.
FREDERICK N. JACOB
JOSEPH C. McGINLEY.
BY Albert E. Bell
ATTORNEY.

Patented Dec. 31, 1940

2,226,822

UNITED STATES PATENT OFFICE 2,226,822

VARIABLE INDUCTANCE MECHANISM

Martin J. Kirk and Frederick N. Jacob, Chicago, and Joseph C. McGinley, Hinsdale, Ill., assignors to Johnson Laboratories, Inc., Chicago, Ill., a corporation of Illinois Application March 21, 1938, Serial No. 197,222

13 Claims. (Cl. 171—242)

Our invention relates to an improved operating mechanism for variable inductance devices, and particularly for that type of devices in which the variation in inductance is secured by moving a core relatively to an inductance coil to change the permeability of the magnetic path of the coil. Our invention is particularly adapted to variable inductances of the kind referred to, which are intended for use in connection with high-frequency apparatus, such as the radio-frequency portions of radio transmitting and receiving apparatus.

By our invention we employ flexible cables connected with the ends of the cores and a common operating mechanism for the cables, such as an operating shaft and a drum structure carried by the shaft, so that all of the cables may be simultaneously operated by rotating the shaft, and so that by properly designing the operating structure, the cores may be simultaneously and similarly moved for tuning purposes in connection with high-frequency resonant circuits. In this manner, we eliminate intermediate carriage structures of all kinds between the operating shaft and the cores, and by employing the insulating tubular mounting of each inductance coil as the support for the corresponding core for all of its positions, we produce a structure that is at once effective, extremely simple, and cheap to manufacture.

Our invention is admirably adapted to the gang operation of a plurality of variable inductance units, since it provides for the simultaneous and similar operation of as many magnetic cores of such units as may be desired, and regardless of the number of cores so operated, the operation of each core is accurately effected and is in no way modified by or dependent upon the operation of any other one of the cores.

Our invention also provides means for continuous tuning over a plurality of frequency ranges in succession, since each movable core may be arranged to cooperate successively with a plurality of coaxially mounted inductance coils.

Our invention will be best understood by reference to the accompanying drawings illustrating preferred embodiments thereof, in which:

Fig. 6 shows in plan view, a modified form of our invention in which two inductance coils are included in the tuning mechanism;

Fig. 7 is a horizontal, sectional view taken along the line 7—7 in Fig. 6, excepting that in this figure the cover of the device is shown in place, whereas in Fig. 6 the cover is removed;

Fig. 8 is a schematic view illustrating the relation of the cable connections employed in Figs. 6 and 7;

Fig. 9 is a vertical, sectional view of a part of the construction shown in Fig. 7, taken along the line 9—9 in that figure;

Fig. 10 shows in a schematic view, a modification of our invention for use in multiple band tuning;

Fig. 11 is a view of a tuning dial adapted for use with the construction shown in Fig. 10;

Fig. 12 shows in a schematic view, a further modification of our invention for use in multiple band tuning; and Fig. 13 is a view of a tuning dial adapted for use with the construction shown in Fig. 12.

Similar numerals refer to similar parts throughout the several views.

Figure 1:
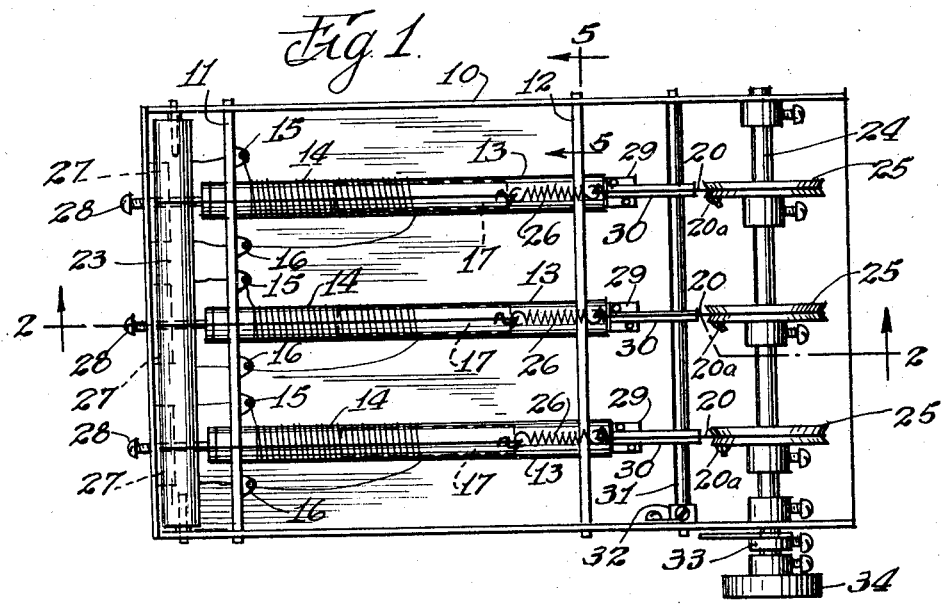
Fig. 1 illustrates in plan view a three-coil tuning mechanism.
Figure 2:
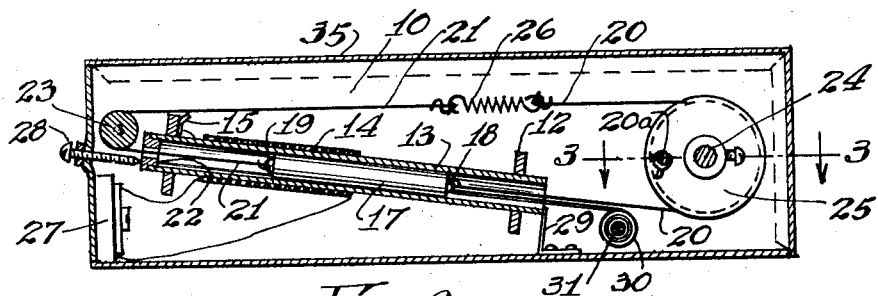
Fig. 2 is a horizontal, sectional view taken along the line 2—2 in Fig. 1, excepting that in this figure the cover of the device is shown in place, whereas in Fig. 1 the cover is removed.
Figure 5:
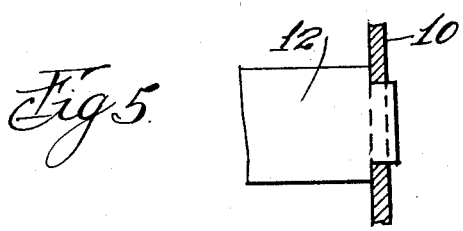
Fig. 5 is a vertical, sectional view to an enlarged scale, of a part of the structure shown in Fig. 1, taken along the line 5—5 in that figure.

As shown in Figs. 1 and 2, the tuning mechanism consists of a casing 10 between the side walls of which strips of insulating material 11 and 12 are supported vertically by having their ends shouldered and fitting in corresponding slots in the side walls of the casing, as illustrated in Fig. 5.

The strips 11 and 12 are provided with aligned apertures through which tubes 13 of insulating material extend with a sliding fit. Each of the tubes 13 has wound thereon near the strip 11 an inductance coil 14, the ends of the winding of each coil being connected with terminal clips 15 and 16 supported by the strip 11.

It is within the scope of the invention to employ, instead of the single-layer solenoidal coils shown, coils of the universal-wound type in which the radial depth usually equals or exceeds the axial length. It is also comprehended that one or more additional windings may be wound on each tube 13 adjacent, or at any desired spacing from, the inductance coils 14. Each tube 13 contains, with a sliding fit, a magnetic core 17. Each of the cores 17 has formed in its ends, staples 18 and 19 connected respectively with cables 20 and 21, the latter extending through the end portions of the corresponding tube 13.

Figure 3:
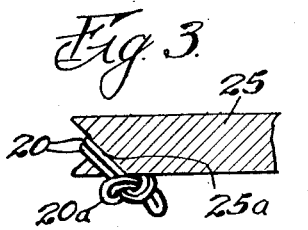
Fig. 3 is a horizontal, sectional view of a part of the structure shown in Fig. 2, taken along the line 3—3 in that figure.

For the relation of the parts shown in Figs. 1 and 2, the left-hand end of each of the tubes 13 is provided with a tubular plug 22 of insulating material through which the corresponding cable 21 extends. Adjacent the plugs 22, a sheave roller 23 is pivotally supported by the side walls of the casing 10, so that its lower surface is substantially in line with the axes of the tubes 13. In the other end of the casing 10, an operating shaft 24 is supported by the side walls of the casing, substantially parallel with the strips 11 and 12 and also with the roller 23, which shaft carries drums 25 secured thereto. Each of the cables 20 extends axially from the corresponding tube 13 around one of the drums 25 and has its end secured to a tensioning spring 26. Each of the cables 21 extends axially from the plugged end of the tube 13 to and around the roller 23, and has its end secured to the other end of the tensioning spring 26. As shown in Fig. 3, each cable 20 is secured to its drum 25 by being doubled and passed through an inclined aperture 25a in the wall of the drum, the doubled projecting portion of the cable being knotted adjacent the side wall of the drum as indicated at 20a.

As a result of the construction described, the spring 26 maintains a tension at all times on the cables 20 and 21 with which it is connected, this tension preferably being much greater than the force required to move the core 17 in the tube 13, and as a result any rotary movement of the shaft 24 will correspondingly move each core 17 in its tube 13, and therefore move the core relatively to the coil 14 carried by the tube, and thereby correspondingly change the permeability of the magnetic path of the corresponding coil 14.

Figure 4:
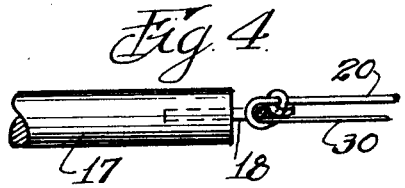
Fig. 4 shows in side elevation and to an enlarged scale, one end portion of one of the magnetic cores shown in Fig. 2.

Each of the coils 14 is illustrated as having its terminals connected with a tuning capacitor 27 having such an amount of capacitance when adjusted, as to produce, with the inductance of the coil 14, a resonant circuit tunable over a desired range of frequencies by moving the core 17 into and out of the coil 14. To align the several resonant circuits which are tuned by movement of the cores 17, so that they may be simultaneously and similarly tuned by the operating mechanism, the cores 17 may first be aligned mechanically by correspondingly setting the drums 25 relatively to the shaft 24 by the set screws indicated; then after the capacitors 27 have been given the proper adjustment to produce the desired resonant frequency at or near the high-frequency end of the tuning range, any one of the coils may be adjusted as a whole relatively to its core, by a screw 28 threaded through the front end wall of the casing 10 and engaging at its inner end the outer end of the plug 22 of the corresponding inductance unit, a light spring 29 being secured to the bottom of the casing and engaging the other end of each tube 13 to hold the plug 22 in engagement with the corresponding adjusting screw 28. The inner end of the screw 28 is preferably pointed or rounded and in engagement with a corresponding depression in the outer end of the plug 22, to prevent displacement of the end of the screw from the end of the plug. If preferred, the coils and cores may be given fixed predetermined positions.

Where it is desired to ground the cores 17, that result is readily accomplished without in any way interfering with the construction and operation described, by providing a thin and narrow strip of metallic conductor 30, one end of which is electrically connected with the corresponding staple 18 of each core 17 which is to be grounded, after which the operating cable 20 is also secured to the staple 18, as illustrated in Fig. 4. The outer end portion of the conducting strip 30 is preferably wound into a spiral form with its end electrically connected with a metal rod 31 extending between the side walls of the casing 10 and connected therewith by a clamping member 32 which not only electrically connects the strips 30 with the casing 10, but also prevents angular movement of the rod 31 to disturb the adjustment of the conducting strips 30 relatively to the rod. It will be observed that the several drums 25 are separate parts as a matter of convenience for adjustment purposes, and that where desired they may be in the form of a single drum of sufficient length to receive all of the cables 20, and that in any event the drums are in effect a composite drum structure carried by the operating shaft for simultaneously operating the cables 20 and thereby the cores 17. It will also be observed that any desired number of inductance units may be mounted as described and operated by a single operating shaft in the manner described, and furthermore, that the inductance units may be given any desired lateral spacing, since the casing 10 may have any desired size, the shaft 24 may have a corresponding length, and as many drums 25 may be provided on the shaft as there are inductance units, since the mounting of each inductance unit and the drum structure employed on the operating shaft to move the core of each unit are not dependent in any way on any other inductance unit or any other part of the drum structure used to operate another or others of the inductance units.

As illustrated, the shaft 24 is shown as carrying a pointer 33 for indicating the particular frequency to which the resonant circuits are tuned at any moment, and an operating knob 34 is also shown secured to the projecting end of the shaft 24. The drum structure 25 is preferably of such a diameter that a single rotation of the shaft 24, or even less than one rotation, will effect such movement of the cores as to cover the desired band of frequencies for which the inductance devices are designed, and where this is the case, the portions of the cables 20 and 21 connected with the tensioning springs 26, may readily be located substantially above the tubes 13, so there will be no interference between the cable portions and the inductance units. It is obvious, however, that any desired proportions in this respect may be used, and that the cables may be provided with additional cable-directing rollers or sheaves in particular cases, if preferred, without in any way modifying the operation of the invention.

In Fig. 2 we illustrate a cover 35 enclosing the casing 10, the cover being removed in Fig. 1 to disclose the parts contained in the casing.

In Figs. 6 and 7, we illustrate a different embodiment of our invention, adapted for use where two variable inductance units are included in the tuning mechanism. In this construction, a casing 40 is shown having side and bottom walls, flange members 41 being formed upwardly from the bottom of the casing, and as shown in Fig.

9, provided with semi-circular seats 41a to receive and support the end portions of insulating tubes 13a held against lateral displacement from the seats by a spring wire 42 resting on the upper surfaces of the tubes 13a at its end portions and held in depressed condition at its mid-portion by a lug 41b formed from the flange 41. The tubes 13a are thus held against lateral displacement on the flanges 41 but are free for limited axial movement relatively to the flanges, for alignment purposes.

Each of the tubes 13a carries an inductance coil 14a, the lower one of the coils, as seen in Fig. 6, being on the right-hand portion of its tube 13a while the upper one of the coils is on the left-hand portion of its tube 13a. Each of the tubes 13a contains with a sliding fit a magnetic core 17a similar to the core 17 above described.

Adjacent the ends of the tubes 13a, cross-shafts 43 and 44 are supported by the side walls of the casing and sufficiently above the tubes 13a to support sheaves 45, 46 and 47, 48 with their lower surfaces substantially in line with the axes of the tubes respectively, the sheaves 45 and 46 being supported by the shaft 43 and the sheaves 47 and 48 being supported by the shaft 44. Above the tubes 13a a central bearing plate 49 is supported in horizontal position by the side walls of the casing 40. An operating shaft 50 is supported for angular movement by the central portion of the bearing plate 49 and by the opposite wall of the casing 40, the shaft having secured to its upper end a cable drum 51. As more clearly shown in Fig. 8, the drum 51 is connected with the cores 17a as follows: The left-hand end of the lower core 17a illustrated in Fig. 8, is connected with a flexible cable 52 which extends around the sheave 45 and then around the drum 51, and then to and around the sheave 46 and to the left-hand end of the upper core 17a, to which it is connected. The right-hand end of the lower core 17a is connected with a flexible cable 53 which extends around the sheave 47 and then around the drum 51, and then to and around the sheave 48, from which it extends to the right-hand end of the upper core 17a, to which it is connected. In passing around the drum 51, a portion of the cable 53 is doubled and drawn through aperture 51a opening through the upper end surface of the drum, so that the cable may be engaged by one end of a tensioning spring 54, the other end of which is in engagement with a pin 55 carried by the drum, the tensioning spring, as a result of the cable connections described, maintaining a desired tension on both of the cables. With the construction described, it is evident that the cable 52 operates by rotation of the shaft 50 to move one or the other of the cores 17a to the left, depending upon the direction of rotation of the shaft 50, while the cable 53 serves to move one or the other of the cores to the right, depending upon the direction of rotation of the operating shaft. The coils 14a are preferably symmetrically placed on the tubes 13a and the cores 17a are similarly related to the coils 14a where simultaneous operation of the cores is desired to similarly and simultaneously tune the coils over a desired range of frequencies, the cables described being adjusted to secure that relation of the cores. The coils 14a are illustrated in Fig. 6 as having their terminals connected respectively with capacitors 27a corresponding to the capacitors 27 above described, by which resonant circuits are produced which are tunable through the desired range of frequencies by adjustment of the operating shaft 50 to effect corresponding inductance adjustment of the coils 14a by movement of their cores 17a. Each of the tubes 13a is engaged at its end portions by springs 29a carried by the casing 40, the springs acting against each other and being so adjusted as to move each of the tubes 13a as far to the left as permitted by a corresponding adjusting screw 28a resting against the left-hand one of the springs 29a. The coils 14a may thereby be moved individually relatively to their cores for alignment purposes.

Where with the construction illustrated in Figs. 6 and 7, it is desired to ground either or both of the cores 17a, this may be done by the use of a thin and narrow strip 30a of conductive material secured to each core to be grounded, and also to a supporting rod 31a carried by the casing 40, in the manner above described for the connecting strips 30 and supporting rod 31. The operating shaft 50 is illustrated as provided with an indicating pointer 33a and operating knob 34a to show the adjustment of the mechanism at any instant and facilitate rotating the operating shaft 50. In Fig. 7 we illustrate the casing 40 as enclosed by a cover 35a, the cover being removed in Fig. 6 to show the parts contained in the casing.

In the embodiment of our invention illustrated in Fig. 10, we show a mounting tube 13b of insulating material on which three axially spaced inductance coils 14b, 14c and 14d are mounted. A core 17b of magnetic material is supported in the tube 13b for longitudinal movement therein, to vary the inductance of the coils 14b, 14c and 14d, one after the other. The tube 13b is supported by bars 56 which also support a contact bar 57 of insulating material carrying the contacts 58 connected with the terminals of the coil 14b, contacts 59 connected with the terminals of the coil 14c, and contacts 60 connected with the terminals of the coil 14d. The structure is provided with switch blocks 61, 62 and 63 carrying switch contacts 64, 65 and 66 respectively, said switch blocks being movable towards and from the contact bar by means of a cam block 67 mounted on an operating rod 68 supported by the bars 56 substantially parallel with the tube 13b and the contact bar 57, so that said rod 68 may be moved longitudinally through said bars 56 to bring the cam block 67 into engagement with the switch blocks 61, 62 and 63 one after the other. The switch blocks are provided with guide pins 69 holding the blocks in proper position and insuring their movement towards and from the contact bar 57, and retracting springs 70 are provided to move the switch blocks away from the contact bar 57 when they are not operated by the cam block 67. The contacts 64, 65 and 66 are so related to the contacts 58, 59 and 60 that when any one of the switch blocks is operated by the cam block 67, the contacts carried by it make electrical contact with the corresponding contacts carried by the contact bar 57.

The ends of the core 17b are provided with connection members or staples 71 connected with flexible cables 72 and 73, the cable 72 extending around an idler sheave or roller 74 and being connected at its end with a tensioning spring 75, while the cable 73 extends around an operated drum 76 and has its end connected with the other end of the spring 75. The drum 76 is supported by an operating shaft 77 corresponding with the operating shaft 24 above described for the construction illustrated in Figs. 1 and 2. The rod 68 is connected with the cable 73 between the tube 13b and the drum 76, by an arm 78, so that movement of the core 17b longitudinally in the tube 13b, simultaneously moves the cam block 67 in the same direction. As shown in Fig. 10, one of each of the contacts 64, 65 and 66 is connected by a wire 79 with the control grid 80 of a thermionic tube 81 and the other one of each of said contacts is connected by a wire 82 with the cathode 83 of said tube, and a fixed capacitor 84 is connected with the wires 79 and 82 to form a resonant circuit with any one of the coils that may be connected with the circuit at any time by operation of the switch blocks 61, 62 and 63.

The coils 14b, 14c and 14d have different inductance values, for example by winding them with different numbers of turns, and in this way the movement of the core 17b into and from any one of said coils will effect a tuning of the resonant circuit then existing, through a corresponding range of frequencies, and as a result of the different inductance values of the coils, different ranges of frequencies are tuned by continuous movement of the core 17b into and from the several coils. The ranges of frequency may have any desired relation to each other and the cam block 67 is so related to the position of the core 17b in the tube 13b, that during the time the core is in operative relation to any one of the coils, the cam block 67 at the same time maintains the corresponding switch block in actuated position to close the contacts carried thereby and thus constitute the coil that is operative, a part of the resonant circuit determined by the capacitor 84. Where it is desired to cover a broad range of frequencies by means of the apparatus, this can conveniently be done by selecting the inductances of the coils and the magnetic effect of the core, so that, for example, with the core fully inserted in the coil 14b, the resonant circuit will be tuned to the lowest frequency provided for by the inductance of the coil 14b and the capacitor 84, which tuned frequency is increased as the core is moved from the coil, until when the core is fully withdrawn from the coil and substantially centered in the coil 14c, the highest tuned frequency of which the coil 14b is capable under the stated conditions, is reached, which is substantially the same as the lowest resonant frequency of the coil 14c with the core 17b fully inserted therein, the arrangement of the switch blocks being such that the switch block 61 is released from the cam block 67 and the switch block 62 is actuated by said cam block to close the contacts 59 and 65 at substantially the time that the core is centered in the coil 14c; continued movement of the core in the same direction increases the resonant frequency of the circuit including the coil 14c until the highest frequency attainable with that coil as a part of the resonant circuit is reached, at which time the core is substantially centered in the coil 14d, the inductance of which then gives a resonant condition at the lowest frequency of the range of the coil 14d, which is substantially the same as the highest frequency of the range for the coil 14c, and the coil 14d is included in the resonant circuit by actuation of the switch block 63 by the cam block 67 which at the same time releases the switch block 62 and opens the circuit of the coil 14c. Other relations of the frequency ranges represented by the several coils may be secured as desired, by differently winding the coils and differently locating them on the tube 13b. The considerable longitudinal movement of the core 17b required to tune the resonant circuit through the entire frequency range referred to, may be the result of a single turn or more than one turn of the operating shaft 77, as preferred. Where accurate indication of the tuning is desired, the drum 76 may be of a size such that the shaft 77 will have substantially one rotation for the frequency range tuned by each of the coils, in which case a dial marking of the kind illustrated in Fig. 11 may be used to advantage, the marking being in the form of a spiral so that the inner turn may represent, for example, tuning from 550 to 1500 kilocycles, a second turn may represent tuning from 1500 kilocycles to 5 megacycles, and a third turn may represent tuning from 5 megacycles to 18 megacycles, these figures being illustrative of one construction and relation of the parts.

In Fig. 12 we illustrate a modified construction of our mechanism in which an insulating tube 13c carries two axially spaced coils 14e and 14f, the adjacent terminals of the coils being connected together and by a wire 85 with the cathode 83a of a thermionic tube 81a, the control grid 80a of which is connected by a wire 86 with the pivotal point of a manually operated switch 87 having contacts 88 and 89 connected respectively by wires 90 and 91 with the other terminals of the coils 14e and 14f. The tube 13c contains an axially movable core 17c of magnetic material having its ends connected with flexible cables 72a and 73a for operation of the core in the manner above described.

The wires 85 and 86 are connected by a fixed capacitor 84a to constitute the particular coil connected in circuit with the wires 85 and 86 by the operation of the switch 87, a part of a resonant circuit tuned by the core 17c.

The inductances of the coils 14e and 14f may be so taken that the inductance of the coil 14e with the core 17c centered in the coil 14f is substantially the same as the inductance of the coil 14f at that time. With that particular relation of the coil inductances, with the core 17c centered in the coil 14e, and the switch 87 moved to its contact 88 to include said coil in circuit with the capacitor 84a, the resonant circuit is tuned to the lowest frequency possible with the coil 14e and as the core 17c is moved from the coil 14e into the coil 14f, the tuned frequency increases until the maximum tuned frequency possible with the core 17c entirely withdrawn from the coil 14e is attained, at substantially the same time that the minimum tuned frequency possible with the coil 14f is available by the position of the core 17c. At this time, the switch 87 may be moved manually to its contact 89, to include the coil 14f in the resonant circuit with the capacitor 84a, and by reverse movement of the core 17c by the operating mechanism attached to the flexible cables 72a and 73a, the core 17c may be moved out from the coil 14f and into the coil 14e, thereby increasing the tuned frequency of the resonant circuit until the core 17c is moved entirely out from the coil 14f and centered in the coil 14e, for which condition a maximum tuned frequency possible with the coil 14f is secured.

In this way, the variable inductance device may be employed to continuously tune a band of frequencies greater than is possible with either of the coils 14e and 14f, each of the coils serving to tune a part of said band, or if preferred, by otherwise proportioning the coils 14e and 14f, two separate bands of frequency may be tuned by the coils 14e and 14f.

Where the coils illustrated in Fig. 12 are employed to tune parts of a wide band of frequencies as above described, we find that a dial of the type shown in Fig. 13 may be used to advantage, in conjunction with a pointer having opposite arms 92 and 92a, the arm 92 constituting a pointer for the coil 14e by which tuning may be indicated over a first part of the complete band of frequencies, for example, from 550 kilocycles to 1500 kilocycles, and the arm 92a constituting a pointer indicating the tuning effected by the coil 14f from, for example, 1500 kilocycles to 5 megacycles. The same form of dial may be employed with other and suitable graduations, where the coils 14e and 14f illustrated in Fig. 12 are employed to tune the resonant circuit to separate bands of frequencies.

It will be understood that in Fig. 10 and also in Fig. 12 we illustrate a single stage tuning mechanism, and that in either case a plurality of similar mechanisms may be used, simultaneously operated by a common operating mechanism, in the manner illustrated either in Figs. 1 and 2 or in Figs. 6 and 7, or by equivalent means.

Where in the specification and claims we use the term "cable," we include within the meaning of that term any connecting medium having the strength and flexibility requisite for effecting the operation of the cores in the manner above described, whether the connecting medium be fibrous, metallic or otherwise; it will be understood that where the cores are required to be electrically insulated from other parts of the mechanism, the cable material should be of an insulating nature; although where it is desired to electrically connect the cores with other parts of the structure, as, for example, in cases where the cores should be grounded, the cable may be of material that is electrically conductive. In practice we find cables of woven silk cords quite effective for the purpose described.

Our mechanism above described is adapted for use wherever it is desired to similarly and simultaneously vary the inductance of a plurality of inductance units through a desired range of inductance values, particularly where it is desirable that the mechanism shall be compact and of light weight. It is thus well adapted for radio apparatus generally, where it is desired to similarly and simultaneously tune resonant circuits throughout a desired range of frequencies, by inductance tuning as distinguished from capacitance tuning, since it provides a self-contained, compact and multiple-stage tuning mechanism which may be assembled as a self-contained unit, in any desired relation and location relatively to the other parts of the transmitting or receiving apparatus, even though the wiring connecting the tuning mechanism with the other parts has substantial length and appreciable capacitance which is added to the fixed capacitances incorporated in the tuning mechanism. For in any such case of fixed assembly of apparatus, the capacitance of the connecting wiring referred to is no disadvantage, since it is made a part of the fixed capacitances required in the resonant circuits of the tuning mechanism to cooperate with the variable inductances employed; in fact, such an arrangement in a radio receiver or transmitter has the desirable advantages of materially reducing interaction between the component parts of the apparatus that would otherwise appear in the operation of the apparatus. These advantages are particularly important, for example, in mobile radio receivers for automobile and other uses, where it is desired that the tuning mechanism shall have a location convenient to the operator, and the remainder of the apparatus, such as the tubes and audio-frequency amplifier, shall be at some distance for remote operation and control by said tuning mechanism.

While we have shown our invention in the particular embodiments above described, it will be understood that we do not limit ourselves thereto as we may employ equivalents without departing from the scope of the appended claims.

Having thus described our invention, what we claim is:

1. Variable inductance mechanism including in combination a plurality of tubes of insulating material, an inductance coil around each of said tubes, a core of magnetic material movable longitudinally in each of said tubes to vary the inductance of the corresponding coil, a flexible cable connecting each end of each of said cores with an end of another of said cores, and a single operating mechanism connected with said cables for simultaneously moving said cores relatively to their respective coils, said coils being located on opposite end portions of said tubes, and said cores having simultaneous movement in opposite directions in said tubes.

2. Variable inductance mechanism including in combination a plurality of tubes of insulating material, an inductance coil around each of said tubes, a core of magnetic material movable longitudinally in each of said tubes to vary the inductance of the corresponding coil, a flexible cable connecting each end of each of said cores with an end of another of said cores, and a single operating mechanism connected with said cables for simultaneously moving said cores relatively to their respective coils, said coils being located on opposite end portions of said tubes, and said cores having simultaneous movement in opposite directions in said tubes, each of said tubes constituting the sole guide and lateral support for its core.

3. As a means for effecting selective permeability tuning of the several stations of a desired band of frequencies, variable inductance mechanism including in combination a plurality of mounting tubes, a stationary support for said tubes, an inductance coil around each of said tubes, a core of magnetic material in and fitting each of said tubes for sliding movement therein and guided solely thereby, each of said cores being movable in its tube into and from the corresponding coil to effect said station selection, flexible cables connected directly with the ends of each of said cores and extending from opposite ends of the corresponding tube, and a common operating mechanism having members in substantial alignment and connected with said cable to simultaneously move said cores longitudinally in their respective tubes to effect said station selection, said flexible cables avoiding binding and wear of said cores in said tubes for small misalignments of said members with said cores respectively.

4. As a means for effecting selective permeability tuning of the several stations of a desired band of frequencies, variable inductance mechanism including in combination a plurality of mounting tubes, a stationary support for said tubes, an inductance coil around each of said tubes, a core of magnetic material in and fitting each of said tubes for sliding movement therein and guided solely thereby, each of said cores being movable in its tube into and from the corresponding coil to effect said station selection, flexible cables connected directly with the ends of each of said cores and extending from opposite ends of the corresponding tube, and a common operating mechanism having members in substantial alignment and connected with said cables to simultaneously move said cores longitudinally in their respective tubes to effect said station selection, said flexible cables avoiding binding and wear of said cores in said tubes for small misalignments of said members with said cores respectively, each of said coils being individually movable longitudinally and relatively to its support for adjustment purposes.

5. As a means for effecting selective permeability tuning of the several stations of a desired band of frequencies, variable inductance mechanism including in combination a plurality of mounting tubes, a stationary support for said tubes, an inductance coil around each of said tubes, a core of magnetic material in and fitting each of said tubes for sliding movement therein and guided solely thereby, each of said cores being movable in its tube into and from the corresponding coil to effect said station selection, flexible cables connected directly with the ends of each of said cores and extending from opposite ends of the corresponding tube, and a common operating mechanism having members in substantial alignment and connected with said cables to simultaneously move said cores longitudinally in their respective tubes to effect said station selection, said flexible cables avoiding binding and wear of said cores in said tubes for small misalignments of said members with said cores respectively, and grounding means comprising a flexible electric conductor connected with one end of each core to be grounded and extending from the corresponding end of the tube containing said core.

6. As a means for effecting selective permeability tuning of the several stations of a desired band of frequencies, a variable inductance device including the combination of a straight tube of insulating material, an inductance coil around said tube, a stationary support for said tube, a core of ferro-magnetic material in and fitting said tube for sliding movement therein and guide solely thereby, said tube extending beyond said coil and guiding said core when the latter is withdrawn from said coil, a flexible cable connected directly with each end of said core and extending from the corresponding end of said tube, devices supporting said cables for free movement into and from said tube ends and exerting opposite forces longitudinally on said core by said cables, and means for moving said cables longitudinally relatively to said tube and for moving said core axially relatively to said coil, thereby correspondingly changing the effect of said core upon the permeability of the magnetic path of said coil, the range of movement of said core by said moving means being from a position inserted in said coil to a position withdrawn from said coil.

7. As a means for effecting selective permeability tuning of the several stations of a desired band of frequencies, a variable inductance device including the combination of a straight tube of insulating material, an inductance coil around said tube, a stationary support for said tube, a core of ferro-magnetic material in and fitting said tube for sliding movement therein and guided solely thereby, said tube extending beyond said coil and guiding said core when the latter is withdrawn from said coil, a flexible cable connected directly with each end of said core and extending from the corresponding end of said tube, devices supporting said cables for free movement into and from said tube ends and exerting opposite forces longitudinally on said core by said cables, and means for moving said cables longitudinally relatively to said tube and for moving said core axially relatively to said coil, thereby correspondingly changing the effect of said core upon the permeability of the magnetic path of said coil, the range of movement of said core by said moving means being from a position inserted in said coil to a position withdrawn from said coil, said tube being movable longitudinally in its said support, a spring having fixed support and pressing against said tube longitudinally thereof, and an adjusting screw having fixed support and extending longitudinally of said tube and holding said tube against movement by said spring, whereby turning said screw moves said tube and said coil axially relatively to said stationary support and relatively to said core for adjustment purposes.

8. As a means for effecting selective permeability tuning of the several stations of a desired band of frequencies, a variable inductance device including the combination of a straight tube of insulating material, an inductance coil around said tube, a stationary support for said tube, a core of ferro-magnetic material in and fitting said tube for sliding movement therein and guided solely thereby, said tube extending beyond said coil and guiding said core when the latter is withdrawn from said coil, a flexible cable connected directly with each end of said core and extending from the corresponding end of said tube, devices supporting said cables for free movement into and from said tube ends and exerting opposite forces longitudinally on said core by said cables, and means for moving said cables longitudinally relatively to said tube and for moving said core axially relatively to said coil, thereby correspondingly changing the effect of said core upon the permeability of the magnetic path of said coil, the range of movement of said core by said moving means being from a position inserted in said coil to a position withdrawn from said coil, said tube and coil being movable longitudinally relatively to said stationary support for adjustment purposes.

9. As a means for effecting selective permeability tuning of the several stations of a desired band of frequencies, a variable inductance device including the combination of a straight tube of insulating material, an inductance coil around said tube, a stationary support for said tube, a core of ferromagnetic material in and fitting said tube for sliding movement therein and guided solely thereby, said tube extending beyond said coil and guiding said core when the latter is withdrawn from said coil, a flexible cable connected directly with each end of said core and extending from the corresponding end of said tube, devices supporting said cables for free movement into and from said tube ends and exerting opposite forces longitudinally on said core by said cables, and means for moving said cables longitudinally relatively to said tube and for moving said core axially relatively to said coil, thereby correspondingly changing the effect of said core upon the permeability of the magnetic path of said coil, the range of movement of said core by said moving means being from a position inserted in said coil to a position withdrawn from said coil, and a grounding connection for said core comprising a flexible electric conductor connected with one end of said core and extending from the corresponding end of said tube.

10. In a variable inductance device, the combination of two supporting bars having aligned apertures therethrough, a tube of insulating material mounted in said apertures, an inductance coil around said tube between said bars, a core of magnetic material contained in said tube and movable longitudinally therein into and from said coil, said tube comprising the sole guide for said core, a flexible cable structure connected directly with the ends of said core and extending longitudinally from the ends of said tube, devices supporting said cable structure for free movement into and from said tube, and means for moving said cable structure and said core longitudinally of said tube to move said core into and from said coil.

11. In a variable inductance device, the combination of two supporting bars having aligned apertures therethrough, a tube of insulating material mounted in said apertures, an inductance coil around said tube between said bars, a core of magnetic material contained in said tube and movable longitudinally therein into and from said coil, said tube comprising the sole guide for said core, a flexible cable structure connected directly with the ends of said core and extending longitudinally from the ends of said tube, devices supporting said cable structure for free movement into and from said tube, and means for moving said cable structure and said core longitudinally of said tube to move said core into and from said coil, said tube being movable longitudinally in said bars and relatively to said core for adjustment purposes.

12. In a variable inductance device, the combination of two supporting bars having aligned apertures therethrough, a tube of insulating material mounted in said apertures, an inductance coil around said tube between said bars, a core of magnetic material contained in said tube and movable longitudinally therein into and from said coil, said tube comprising the sole guide for said core, a flexible cable structure connected directly with the ends of said core and extending longitudinally from the ends of said tube, devices supporting said cable structure for free movement into and from said tube, and means for moving said cable structure and said core longitudinally of said tube to move said core into and from said coil, and a grounding connection for said core comprising a flexible electric conductor connected with one end of said core and extending from the corresponding end of said tube.

13. As a means for effecting selective permeability tuning of the several stations of a desired band of frequencies, variable inductance mechanism including in combination a plurality of mounting tubes, a support for said tubes, an inductance coil around each of said tubes, a core of magnetic material in each of said tubes for sliding movement therein and guided solely thereby, each of said cores being movable in its tube into and from the corresponding coil to effect said station selection, flexible cables connected directly with the ends of each of said cores and extending from opposite ends of the corresponding tube, and a common operating mechanism having members in substantial alignment and connected with said cables to simultaneously move said cores longitudinally in their respective tubes to effect said station selection.

MARTIN J. KIRK.
FREDERICK N. JACOB.
JOSEPH C. McGINLEY.